US012300907B2

(12) United States Patent
Segador Alvarez et al.

(10) Patent No.: US 12,300,907 B2
(45) Date of Patent: May 13, 2025

(54) ANTENNA ELEMENT FOR A MULTI-BAND ANTENNA DEVICE

(71) Applicant: HUAWEI TECHNOLOGIES CO., LTD., Shenzhen (CN)

(72) Inventors: Juan Segador Alvarez, Munich (DE); Liansong Wang, Dongguan (CN); Dmitrij Semilovsky, Munich (DE); Zhi Gong, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 152 days.

(21) Appl. No.: 18/170,740

(22) Filed: Feb. 17, 2023

(65) Prior Publication Data

US 2023/0198147 A1 Jun. 22, 2023

Related U.S. Application Data

(63) Continuation of application No. PCT/EP2020/072954, filed on Aug. 17, 2020.

(51) Int. Cl.
*H01Q 5/40* (2015.01)
*H01Q 5/392* (2015.01)

(52) U.S. Cl.
CPC ............... *H01Q 5/40* (2015.01); *H01Q 5/392* (2015.01)

(58) Field of Classification Search
CPC .......... H01Q 5/40; H01Q 5/392; H01Q 9/285; H01Q 1/521; H01Q 21/0075;
(Continued)

(56) References Cited

U.S. PATENT DOCUMENTS

2004/0085250 A1 5/2004 Tillery
2007/0008236 A1 1/2007 Tillery et al.
(Continued)

FOREIGN PATENT DOCUMENTS

CN 103746193 A 4/2014
CN 110828986 A 2/2020
(Continued)

OTHER PUBLICATIONS

India Office Action issued in corresponding India Application No. 202337011340, dated Feb. 8, 2024, pp. 1-5.
(Continued)

*Primary Examiner* — David E Lotter
(74) *Attorney, Agent, or Firm* — HAUPTMAN HAM, LLP

(57) ABSTRACT

An antenna element for a multi-band antenna device includes a dielectric body provided with one or more metal layers. The dielectric body includes a base plate and one or more wall elements arranged on the base plate. One or more first radiating elements and one or more second radiating elements are arranged on the base plate, and are configured to radiate in a first and a second frequency band, respectively. A first feeding network is connected to the first radiating elements and a second feeding network is connected to the second radiating elements, for operating the first and second radiating elements as a first and second antenna array, respectively. The first feeding network is provided, at least partly, as a metal layer of the one or more metal layers on the one or more wall elements.

20 Claims, 14 Drawing Sheets

(58) Field of Classification Search
CPC ............. H01Q 21/0087; H01Q 19/108; H01Q 21/062; H01Q 21/065; H01Q 19/106; H01Q 5/42; H01Q 1/246; H01Q 9/0407; H01Q 21/24; H01Q 9/065; H01Q 1/38; H01Q 21/0025
See application file for complete search history.

(56) References Cited

U.S. PATENT DOCUMENTS

| | | | | |
|---|---|---|---|---|
| 2009/0224995 | A1* | 9/2009 | Puente | H01Q 1/42 343/893 |
| 2015/0295313 | A1* | 10/2015 | Zimmerman | H01Q 5/42 343/810 |
| 2017/0170549 | A1 | 6/2017 | Buondelmonte | |
| 2019/0319364 | A1* | 10/2019 | Yang | H01Q 21/28 |
| 2020/0091608 | A1* | 3/2020 | Alpman | H01Q 5/47 |

FOREIGN PATENT DOCUMENTS

| | | | |
|---|---|---|---|
| CN | 111355016 | A | 6/2020 |
| EP | 3327865 | A1 | 5/2018 |
| EP | 3065217 | B1 | 7/2018 |
| EP | 3166178 | B1 | 9/2019 |
| EP | 3535806 | B1 | 7/2021 |
| JP | 2014039192 | A | 2/2014 |
| WO | 2017076714 | A1 | 5/2017 |
| WO | 2018103822 | A1 | 6/2018 |

OTHER PUBLICATIONS

International Search Report issued in corresponding International Application No. PCT/EP2020/072954, dated May 6, 2021, 17 pages.

Japanese Office Action issued in corresponding Japanese Application No. 2023-512019, dated May 21, 2024, pp. 1-14.

* cited by examiner

ANTENNA ELEMENT FOR A MULTI-BAND ANTENNA DEVICE

CROSS-REFERENCE TO RELATED APPLICATIONS

This application is a continuation of International Application No. PCT/EP2020/072954, filed on Aug. 17, 2020, the disclosure of which is hereby incorporated by reference in its entirety.

TECHNICAL FIELD

The present disclosure relates to antenna devices and antenna elements. In particular, the disclosure provides an antenna element for a multi-band antenna device, provides the multi-band antenna device, and provides a method for fabricating the antenna element.

BACKGROUND

With the deployment of 5th generation (5G) mobile networks, new frequency bands of 700 MHz and 3.5 GHz, respectively, are introduced. Therefore, there is a growing demand in the market to develop new antenna devices, which support an increased number of bands. For instance, the new antenna devices should support two or more of the following frequency bands: 700 MHz, 800 MHz, 900 MHz, 1.4 GHz, 1.8 GHz, 2.1 GHz, 2.6 GHz, and 3.5 GHz. In addition, in order to fully exploit the capabilities of New Radio (NR)/5G standards, the number of radio channels, antenna ports, and antenna columns per frequency band should also be increased for the new antenna devices.

However, despite this desire to increase the number of frequency bands and antenna ports per band, the limitation of one antenna devices per sector (or at maximum two antenna devices per sector, in exceptional cases) is still a rather strict requirement. In addition, to facilitate antenna site acquisition and/or to be able to reuse current mechanical support structures already installed at the antenna sites, the form factor and the wind-load of the new antenna devices should be comparable to that of current products. That is, the new antenna devices should not require additional boxes and should also not require bigger boxes at the antenna sites than the currently installed antenna devices.

This leads to an increased complexity and thus to challenges in designing the new antenna devices. In particular, any new technology or antenna device concept, which enables the integration of several frequency bands together in a neat (compact) and efficient way, becomes really valuable.

SUMMARY

In view of the above-mentioned challenges, one or more embodiments of the present disclosure aim to provide a new multi-band antenna device. An objective of one or more embodiments thereby is to provide an antenna element, which enables building the new multi-band antenna device, without increasing a form factor or wind-load of the new antenna device compared to a current antenna device. For instance, a goal of one or more embodiments is to provide a dual-band antenna element, which includes in a single part at least a part of each antenna array of radiating elements (i.e., an array for each frequency band) and both feeding networks for each array. Line crossings between the feeding networks should be avoided in one or more embodiments.

The antenna element, and accordingly the new antenna device of one or more embodiments, should further be less complex than a comparable current antenna device, for instance, should not require the use of multi-layer PCB structures for forming the feeding networks in one or more embodiments. In addition, the antenna element and new antenna device of one or more embodiments should fulfill requirements of the next generations of base station antennas.

One or more of the described objectives are achieved by one or more embodiments described herein.

In particular, one or more embodiments of the present disclosure address the multi-band integration problem by using a dielectric body with one or more metal layers, for example, a metallized plastic body. Metallized plastic structures are used in other technical fields to create complex 3D structures, thereby reducing the number of parts and interconnections. For instance, the use of metallize plastic structures is explored for handset devices and automotive. Some approaches also use metallized plastic for base station antennas. However, for base station antennas the technology is more challenging to use, mainly because of the type of radiating elements and the requirements on size and levels of intermodulation.

A first aspect of the present disclosure provides an antenna element for a multi-band antenna device, the antenna element comprising: a dielectric body provided with metal layers, the dielectric body comprising a base plate and one or more wall elements arranged on the base plate; one or more first radiating elements arranged on the base plate, each first radiating element being configured to radiate in a first frequency band; one or more second radiating elements arranged on the base plate, each second radiating element being configured to radiate in a second frequency band; a first feeding network connected to the one or more first radiating elements, for operating the one or more first radiating elements as a first antenna array; and a second feeding network connected to the one or more second radiating elements, for operating the one or more second radiating elements as a second antenna array; wherein the first feeding network is provided, at least partly, as a metal layer of the one or more metal layers on the one or more wall elements.

The antenna element of the first aspect, by being provided with the dielectric body and at least one metal layer arranged on the one or more wall elements to form the first feeding network, allows integrating both feeding networks in a more limited space. Thereby, the use of multilayer structures and/or line crossing can be avoided, when forming the two feeding networks. Compared to current antenna devices, no additional Printed Circuit Boards (PCBs) are required to distribute the respective Radio Frequency (RF) signals to the radiating elements of the different antenna arrays, since all parts of the feeding networks can be implemented in one component.

The one or more wall elements arranged on the base plate may be formed integrally with the base plate and/or may protrude from the base plate. Further, the first frequency band and the second frequency band may be overlapping or non-overlapping frequency bands.

In an implementation form of the first aspect, the one or more wall elements comprise an outer wall element, which extends along the edges of the base plate, and a part of the first feeding network is provided as a metal layer of the one or more metal layers on the outer wall element.

Thus, the first feeding network can be provided for feeding the first radiating elements of the first antenna array, without any line crossings with the second feeding network.

In an implementation form of the first aspect, the part of the first feeding network is provided as a metal layer of the one or more metal layers on one of the surfaces of the outer wall element, and a ground for the first feeding network is provided as a metal layer of the one or more metal layers on the opposite surface of the outer wall element.

Thus, the space provided by the outer wall element is more efficiently used to provide the first feeding network.

In an implementation form of the first aspect, the outer wall element is configured to conform radiation from the one or more first radiating elements and/or from the one or more second radiating elements.

Thus, the outer wall element may be further used to improve the radiation characteristics of the antenna element, for instance, a directivity of the radiation pattern of the antenna element, as well as the port parameters of the antenna element, for instance, the coupling with adjacent antenna columns arranged side-by-side in the multiband antenna.

In an implementation form of the first aspect, the first feeding network comprises a first feeding element for operating the one or more first radiating elements according to a first polarization, and a second feeding element for operating the one or more first radiating elements according to a second polarization; and the outer wall element comprises a first wall section and a second wall section; and the first feeding element is provided as a metal layer of the one or more metal layers on the first wall section, and the second feeding element is provided as a metal layer of the one or more metal layers on the second wall section.

Thus, the space on the outer wall element may be efficiently used to feed the first radiating elements of the first antenna array.

In an implementation form of the first aspect, the one or more wall elements further comprise one or more inner wall elements, each inner wall element connecting the outer wall element to one of the one or more first radiating elements; and a part of the first feeding network is provided as a metal layer of the one or more metal layers on the inner wall elements.

Accordingly, additional wall elements may be used to provide/form the first feeding network, in particular, to connect the first feeding network to all first radiating elements, also those which are located more centrally in the first array (especially in case of a larger first array comprising, for example, multiple rows and columns of radiating elements). Furthermore, the inner wall elements may be used for additional isolation between the first radiating elements and the second radiating elements, thus improving the radiation characteristics of the antenna element.

In an implementation form of the first aspect, the second feeding network is provided, at least partly, as a metal layer of the one or more metal layers on the base plate.

Thus, the dielectric body is used to form both feeding networks in an efficient manner, i.e., with less space required and without any line crossings or multi-layer structures being necessary.

In an implementation form of the first aspect, the one or more wall elements and the radiating elements are arranged on an upper surface of the base plate; a part of the second feeding network is provided as a metal layer of the one or more metal layers on a lower surface of the base plate; and the base plate is arranged on a reflector plate of the antenna element, the reflector plate serving as ground for the second feeding network.

In an implementation form of the first aspect, the reflector plate is configured to reflect radiation from the one or more first radiating elements and/or from the one or more second radiating into a main radiation direction.

In an implementation form of the first aspect, the one or more wall elements and the radiating elements are arranged on an upper surface of the base plate, the second feeding network is provided as a metal layer of the one or more metal layers on the upper surface of the base; plate; and a ground for the second feeding network is provided as a metal layer of the one or more metal layers on the lower surface of the base plate.

In this way, the base plate of the dielectric body is efficiently used to provide more space for the second feeding network.

In an implementation form of the first aspect, the first feeding network and the second feeding network are arranged without line crossing of feeding lines of the first feeding network and the second feeding network.

In an implementation form of the first aspect, the one or more first radiating elements are one or more low band (LB) radiating elements, and the one or more second radiating elements are one or more high band (HB) radiating elements; or the one or more first radiating elements are one or more HB radiating elements, and the one or more second radiating elements are one or more LB radiating elements.

Accordingly, the antenna element allows fabricating an integrated multi-band antenna device with at least two different frequency bands.

In an implementation form of the first aspect, the first frequency band is lower than the first frequency band; and/or the first frequency band is a frequency range of 1.7-2.7 GHz, and the second frequency band is a frequency range of 3.3-3.8 GHz.

In an implementation form of the first aspect, the one or more first radiating elements comprise one or more dipole radiating elements; and/or the one or more second radiating elements comprise one or more patch radiating elements.

In an implementation form of the first aspect, the one or more first radiating elements and/or the one or more second radiating elements comprise one or more linear dual-polarized radiating elements.

In an implementation form of the first aspect, the one or more first radiating elements and/or the one or more second radiating elements are formed, at least partly, by the dielectric body.

Thus, the dielectric body of the antenna element has a further purpose, namely forming at least in part the radiating elements. A more compact antenna element, which is also simple to fabricate, is thus possible.

In an implementation form of the first aspect, each of the one or more second radiating elements comprises a first patch formed by the dielectric body, and comprises a second patch stacked onto the first patch.

In this way, the bandwidth of the second antenna array can be increased.

In an implementation form of the first aspect, each of the one or more first radiating element comprises a balun formed by the dielectric body, and comprises a PCB, in which a dipole is formed, the PCB being connected to the balun.

In this way, the molding of the dielectric body and, e.g., metallization thereof, becomes simpler, and production costs can be reduced.

In an implementation form of the first aspect, the second patch and the PCB are formed by a further dielectric body of the antenna element, the further dielectric body being attached to the dielectric body.

In this way, the antenna element can be formed in a simpler manner, and the number of components can be reduced.

A second aspect of the present disclosure provides multi-band antenna device comprising one or more antenna elements, each configured according to the first aspect or any of its implementation forms.

A third aspect of the present disclosure provides a method for producing an antenna element for a multi-band antenna device, the method comprising: forming a dielectric body comprising a base plate and one or more wall elements arranged on the base plate; forming one or more first radiating elements arranged on the base plate, each first radiating element being configured to radiate in a first frequency band; forming one or more second radiating elements arranged on the base plate, each second radiating element being configured to radiate in a second frequency band; forming a first feeding network connected to the one or more first radiating elements, for operating the one or more first radiating elements as a first antenna array; and forming a second feeding network connected to the one or more second radiating elements, for operating the one or more second radiating elements as a second antenna array; wherein the first feeding network is formed, at least partly, by metallizing the one or more wall elements.

In an implementation form of the third aspect, the one or more wall elements comprise an outer wall element, which extends along the edges of the base plate, and a part of the first feeding network is formed by metallizing the outer wall element.

In an implementation form of the third aspect, the part of the first feeding network is formed by metallizing one of the surfaces of the outer wall element, and a ground for the first feeding network is formed by metallizing the opposite surface of the outer wall element.

In an implementation form of the third aspect, the outer wall element is formed to be configured to conform radiation from the one or more first radiating elements and/or from the one or more second radiating elements.

In an implementation form of the third aspect, the first feeding network comprises a first feeding element for operating the one or more first radiating elements according to a first polarization, and a second feeding element for operating the one or more first radiating elements according to a second polarization; and the outer wall element comprises a first wall section and a second wall section; and the first feeding element is formed by metallizing the first wall section, and the second feeding element is formed by metallizing the second wall section.

In an implementation form of the third aspect, the one or more wall elements further comprise one or more inner wall elements, each inner wall element connecting the outer wall element to one of the one or more first radiating elements; and a part of the first feeding network is formed by metallizing the inner wall elements.

In an implementation form of the third aspect, the second feeding network is formed, at least partly, by metallizing the base plate.

In an implementation form of the third aspect, the one or more wall elements and the radiating elements are arranged on an upper surface of the base plate; a part of the second feeding network is formed by metallizing a lower surface of the base plate; and the base plate is formed on a reflector plate of the antenna element, the reflector plate serving as ground for the second feeding network.

In an implementation form of the third aspect, the reflector plate is configured to reflect radiation from the one or more first radiating elements and/or from the one or more second radiating into a main radiation direction.

In an implementation form of the third aspect, the one or more wall elements and the radiating elements are arranged on an upper surface of the base plate, the second feeding network is formed by metallizing the upper surface of the base; plate; and a ground for the second feeding network is formed by metallizing the lower surface of the base plate.

In an implementation form of the third aspect, the first feeding network and the second feeding network are formed without line crossing of feeding lines of the first feeding network and the second feeding network.

In an implementation form of the third aspect, the one or more first radiating elements are one or more LB radiating elements, and the one or more second radiating elements are one or more HB radiating elements; or the one or more first radiating elements are one or more HB radiating elements, and the one or more second radiating elements are one or more LB radiating elements.

In an implementation form of the third aspect, the first frequency band is lower than the first frequency band; and/or the first frequency band is a frequency range of 1.7-2.7 GHz, and the second frequency band is a frequency range of 3.3-3.8 GHz.

In an implementation form of the third aspect, the one or more first radiating elements comprise one or more dipole radiating elements; and/or the one or more second radiating elements comprise one or more patch radiating elements.

In an implementation form of the third aspect, the one or more first radiating elements and/or the one or more second radiating elements comprise one or more linear dual-polarized radiating elements.

In an implementation form of the third aspect, the one or more first radiating elements and/or the one or more second radiating elements are formed, at least partly, by the dielectric body.

In an implementation form of the third aspect, each of the one or more second radiating elements comprises a first patch formed by the dielectric body, and comprises a second patch stacked onto the first patch.

In an implementation form of the third aspect, each of the one or more first radiating element comprises a balun formed by the dielectric body, and comprises a PCB, in which a dipole is formed, the PCB being connected to the balun.

In an implementation form of the third aspect, the second patch and the PCB are formed by a further dielectric body of the antenna element, the further dielectric body being attached to the dielectric body.

The method of the third aspect and its implementation forms provides the same advantages as described above for the antenna element of the first aspect. The method of the third aspect results in the fabrication of the antenna element of the first aspect and thus leads to the mentioned advantages. In particular, the antenna element of the first aspect and the multi-band antenna device of the second aspect, respectively, can be easily fabricated using the method of the third aspect.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities.

Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof.

BRIEF DESCRIPTION OF DRAWINGS

The above described aspects and implementation forms will be explained in the following description of specific embodiments in relation to the enclosed drawings, in which.

DETAILED DESCRIPTION OF EMBODIMENTS

Figure 1:
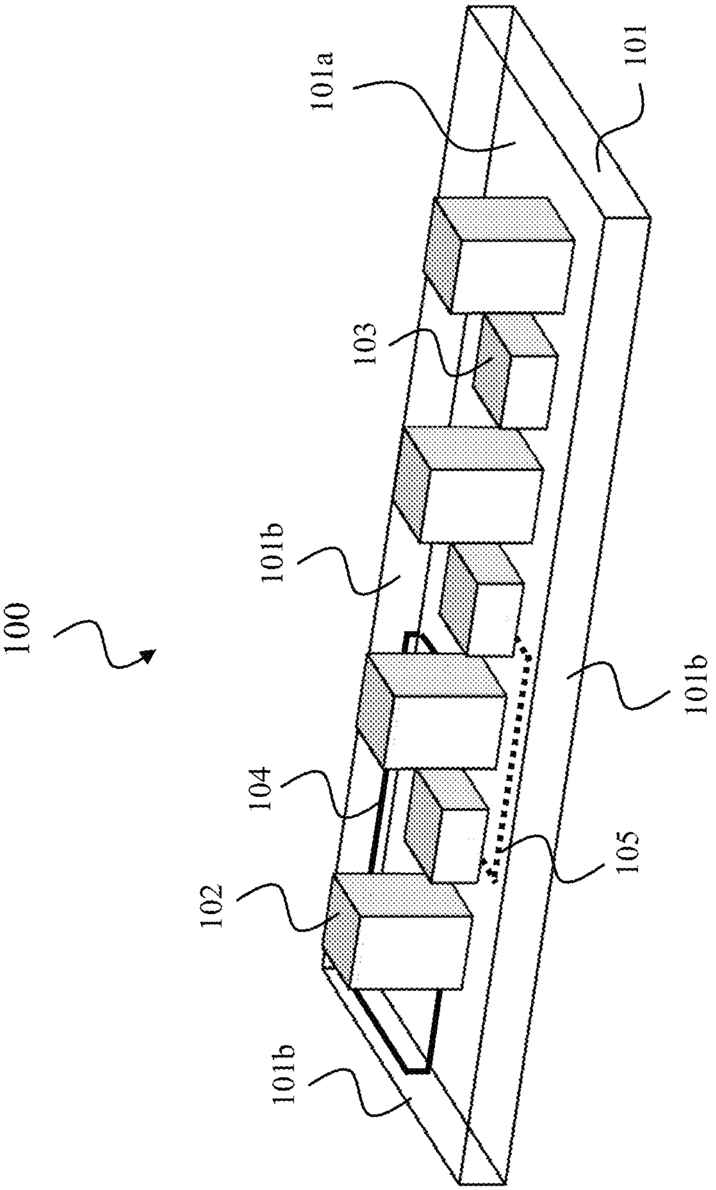
FIG. 1 shows an antenna element according to at least one embodiment.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, an antenna element is configured to have a dielectric body with one or more metal layers arranged on the dielectric body. The one or more metal layers form one or more feeding networks for at least two different antenna arrays of radiating elements of the antenna element, wherein each array comprises one or more radiating elements.

FIG. 1 shows an antenna element 100 according to at least one embodiment. The antenna element 100 may be used to form a multi-band antenna device, for instance, a dual-band antenna device or a triple-band antenna device. The antenna element 100 of FIG. 1 is exemplarily shown to work in two frequency bands, but it may work in more than two frequency bands.

The antenna element 100 comprises a dielectric body 101 provided with one or more metal layers. The one or more metal layers may be arranged on the dielectric body 101, particularly on surfaces of the dielectric body 101. However, one or more metal layers could also be provided within the dielectric body 101. Further, the dielectric body may be made of plastic. In particular, the dielectric body may thus be a selectively metallized plastic part. The dielectric body 101 comprises a base plate **101*a* and one or more wall elements 101*b*, 101*c*, which are arranged on the base plate 101*a*. The one or more wall elements 101*b*, 101*c* may protrude from the base plate 101*a* along a z-axis (i.e., an axis normal to the base plate), and may further be formed integrally with the base plate 101*a*. The one or more wall elements 101*b*, 101*c* may comprise an outer wall element 101*b*, for instance, surrounding the base plate 101*a*, i.e., extending along the edges of the base plate 101*a* (as shown in FIG. 1). Further, the one or more wall elements 101*b*, 101*c* may comprise one or more inner wall elements 101*c*, i.e., one or more wall elements 101*c* (shown in FIG. 2) that are arranged centrally on the base plate 101*a* and/or are arranged within the area surrounded by the outer wall element 101*b***.

Further, the antenna element 100 comprises one or more first radiating elements 102, which are arranged on the base plate **101*a*, for example regularly (e.g., in rows and/or columns) or irregularly, wherein each first radiating element 102 is configured to radiate in a first frequency band. The antenna element 100 also comprises one or more second radiating elements 103 arranged on the base plate 101*a*, for example regularly (e.g., in rows and/or columns) or irregularly, and/or interleaved with the first radiating elements 102, wherein each second radiating element 103** is configured to radiate in a second frequency band. The first frequency band and the second frequency band may be different frequency bands. For instance, the first frequency band may be lower than the second frequency band, or vice versa. The first frequency band and the second frequency band may be overlapping, in particular, partially overlapping, or they may be non-overlapping. For instance, the first frequency band may be a frequency range of 1.7-2.7 GHz, and the second frequency band may be a frequency range of 3.3-3.8 GHz.

The one or more first radiating elements 102 may comprise one or more dipole radiating elements, and/or the one or more second radiating elements 103 may comprise one or more patch radiating elements, or vice versa. Thereby, the one or more first radiating elements 102 and/or the one or more second radiating elements 103 may comprise one or more linear dual-polarized radiating elements. The first radiating elements 102 may comprise one or more LB radiating elements, and may thus form an LB antenna array. The second radiating elements 103 may comprise one or more HB radiating elements, and may thus form a HB antenna array. Alternatively, the first radiating elements 102 may comprise one or more HB radiating elements, and the second radiating elements, 103 may comprise one or more LB radiating elements. The one or more first radiating elements 102 and/or the one or more second radiating elements 103 may be formed, at least partly, by the dielectric body 101, i.e., by one or more metal layers of the dielectric body 101.

The antenna element 100 further comprises a first feeding network 104 connected to the one or more first radiating elements 102, for operating the one or more first radiating elements 102 as a first antenna array. Further, the antenna element 100 comprises a second feeding network 105 connected to the one or more second radiating elements 103, for operating the one or more second radiating elements 103 as a second antenna array. The first feeding network 104 and/or the second feeding network 105 may comprise one or more feeding lines, in particular, to connect to the respective radiating elements 102/103 fed by the feeding network 104/105. The first feeding network 104 and the second feeding network 105 may thereby be arranged without any crossings of respective feeding lines. Neither the first feeding network 104 nor the second feeding network 105 may further require a multi-layer structure.

In particular, the first feeding network 104 is provided, at least partly, as a metal layer of the one or more metal layers on the one or more wall elements 101*b*, 101*c*, i.e., is formed by the dielectric body 101. For instance, the first feeding network 104 may be provided on the outer wall element 101*b* and/or on one or more inner wall elements 101*c*. That is, the first feeding network 104 may be integrated into the wall elements 101*b*, 101*c* of the dielectric body 101 of the antenna element 100. For instance, the one or more wall elements 101*b*, 101*c* may have first surfaces wherein the first feeding network 104 is provided, particularly as metallization or a metal layer, on the first surfaces. Further, the one or more wall elements 101*b*, 101*c* may have second surfaces, which may be used as ground for the feeding network 104, the ground being provided as metallization or a metal layer on the second surfaces. The outer wall element 101*b* may further serve as an electrical fencing, which is configured to conform the radiation pattern of one or both of the first and second frequency band. That is, the outer wall element 101*b* may be configured to conform radiation from the one or more first radiating elements 102 and/or from the one or more second radiating elements 103.

Also the second feeding network 105 may be provided, at least partly, as a metal layer on the dielectric body 101, particularly on the base plate 101*a*. That is, the second feeding network 105 may be integrated into a bottom part of the dielectric body 101 of the antenna element 100. It is, however, also possible to provide, at least part of, the second feeding network 105 on the one or more wall elements 101*b*, 101*c*.

Figure 2:
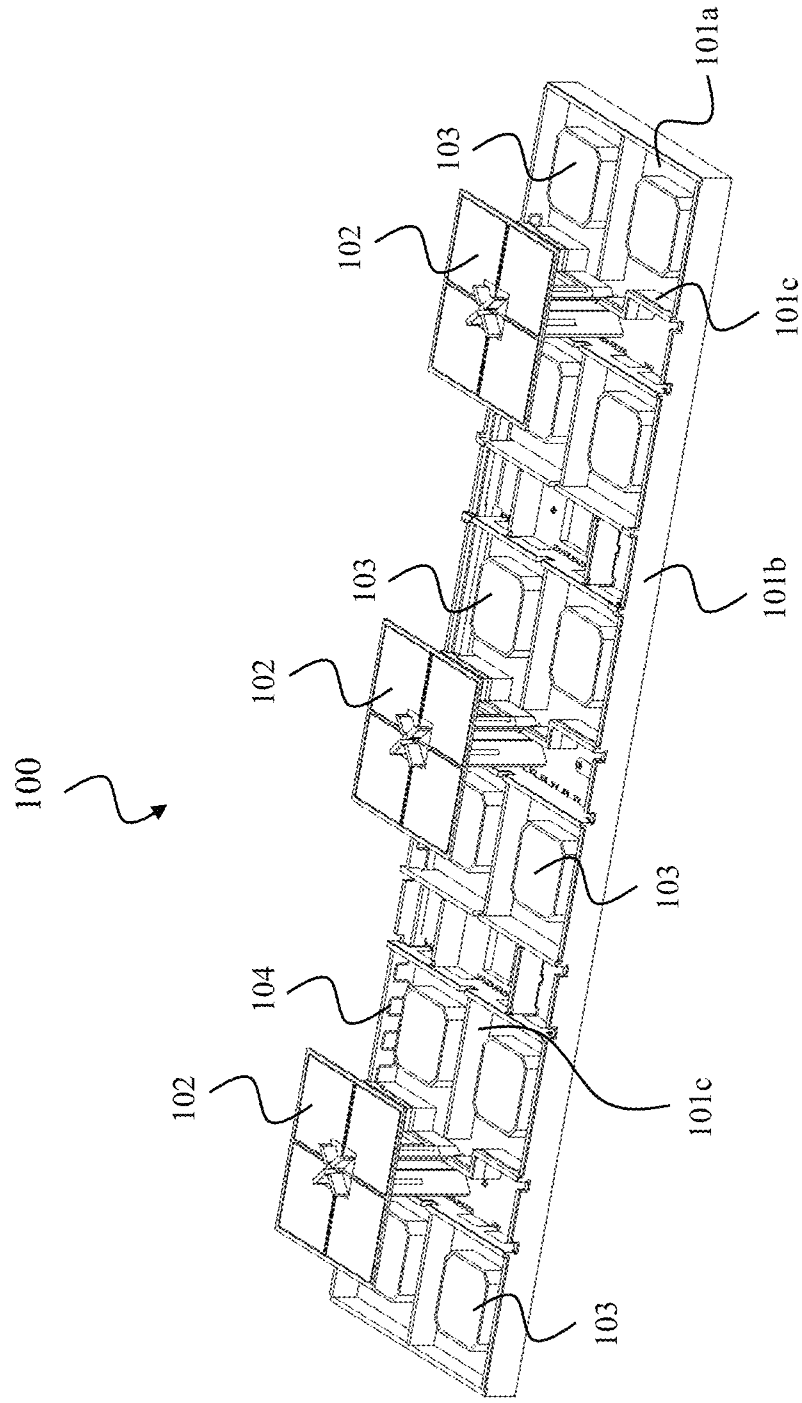
FIG. 2 shows a top view of an antenna element according to at least one embodiment.
Figure 3:
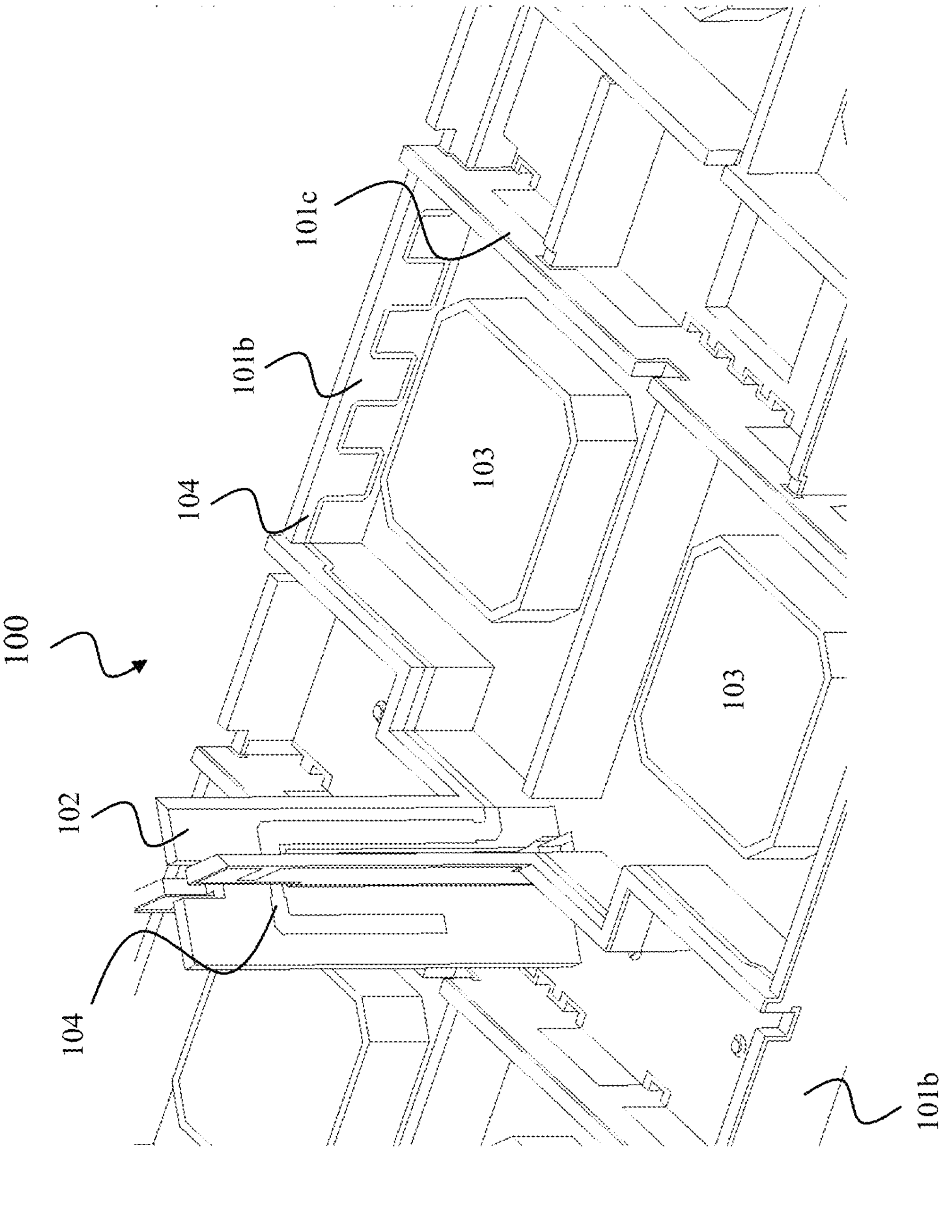
FIG. 3 shows an enlarged top view of the antenna element of FIG. 2.
Figure 4:
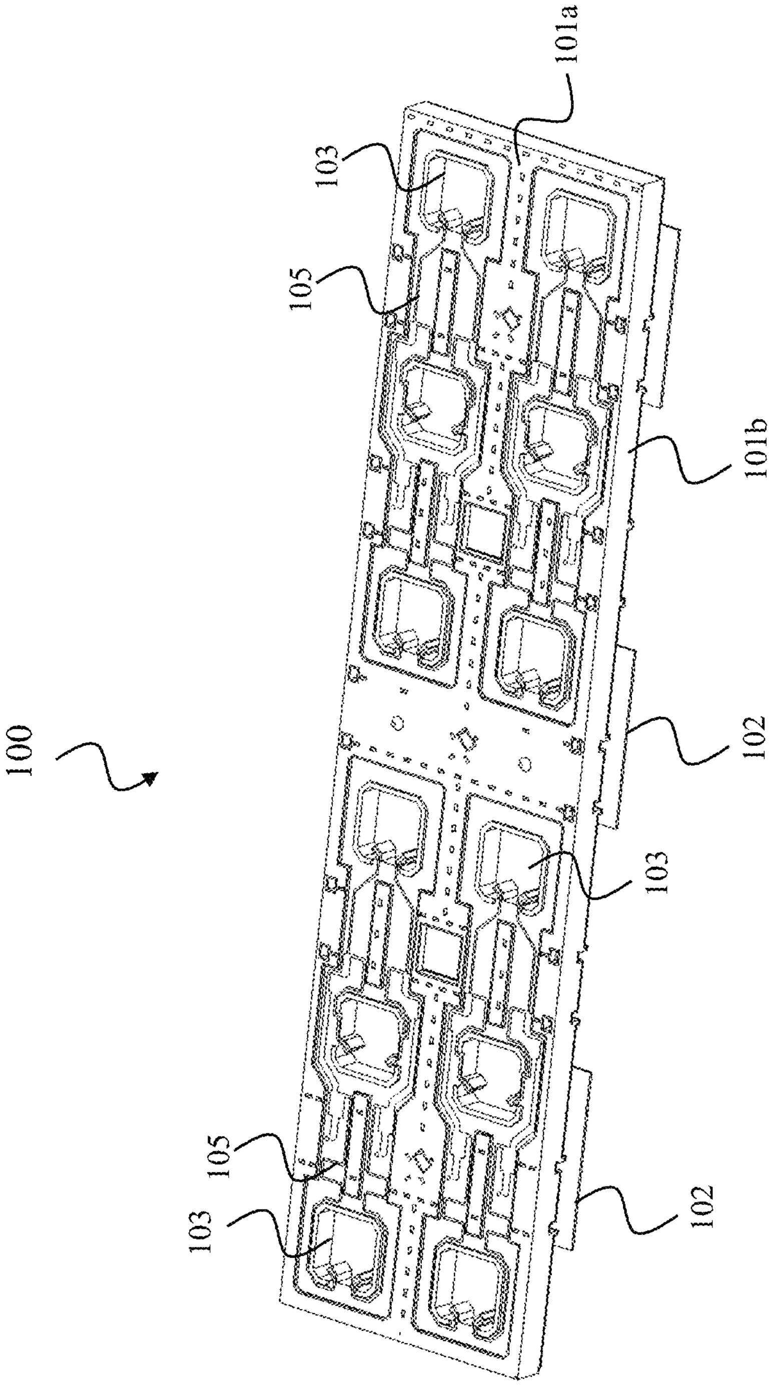
FIG. 4 shows a bottom view of the antenna element of FIG. 2 and FIG. 3.
Figure 5:
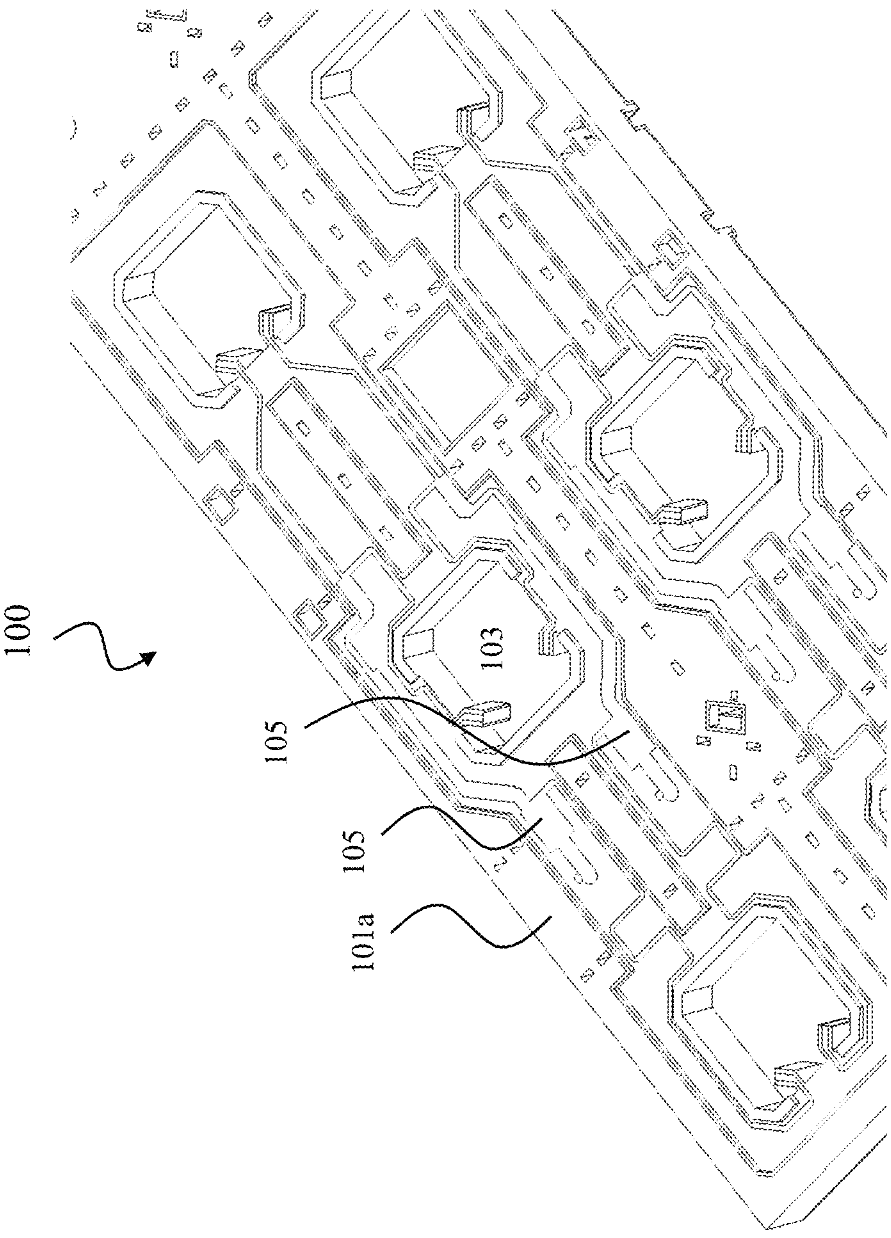
FIG. 5 shows an enlarged view of the antenna element of FIG. 4.

FIGS. 2-5 show an antenna element 100 according to at least one embodiment, which builds on the antenna element (s) described with respect to FIG. 1. Same elements in FIG. 1 and FIGS. 2-5 are provided with the same reference signs, and may be implemented likewise. In particular, FIG. 2 shows a top-view of the antenna element 100, FIG. 3 shows an enlarged top-view of the antenna element 100, FIG. 4 shows a bottom-view of the antenna element 100, and FIG. 5 shows an enlarged bottom-view of the antenna element 100.

In particular, in FIGS. 2-5, the first radiating elements 102 are LB radiating elements and form an LB array, and the second radiating elements 103 are HB radiating elements and form a HB array.

As can be seen in FIG. 2 and FIG. 3, the first feeding network 105 of the LB radiating elements 102 is arranged at least partly on the one or more wall elements 101*b*, 101*c*. The first feeding network 104 is particularly arranged on the outer wall element 101*b* of the dielectric body 101. Thereby, one of the polarizations may be arranged in a first wall section of the outer wall element 101*b*, for instance, the left part of the outer wall element 101*b*. The other polarization may be arranged in a second wall section of the outer wall element 101*b*, for instance, the right part of the outer wall element 101*b*. The inner wall elements 101*c* of the dielectric body 101 may be used to route signals from the LB radiating elements 102 (those arranged in the center, particularly arranged between the HB radiating elements 103) to the outer wall element 101*b*. The first feeding network 104 could also be arranged on the inner wall elements 101*c* of the dielectric body 101.

As can be seen in FIG. 4 and FIG. 5, the second feeding network 105 of the HB radiating elements is arranged in the lower surface of the bottom area of the dielectric body 101, i.e., in the base plate 101*a*. The dielectric body 101 is further arranged on top of a reflector plate that serves as ground for the second feeding network 105 for the HB array. An implementation, in which the second feeding network 105 is arranged on the upper surface of the base plate 101*a* of the dielectric body 101, and the ground is arranged in the lower surface of the base plate 101*a* or vice versa (without using any reflector plate), is also possible.

In FIGS. 2-5, as an example, the HB is 3.3-3.8 GHz and the LB band is 1.7-2.7 GHz. The spacing between HB radiation elements 103 may be 43 mm in horizontal and 62.5 mm in vertical, whereas the vertical spacing between the LB radiating elements 102 may be 125 mm.

The LB radiating elements may be cross-fed dipoles and the HB radiating elements 103 may probe-fed patches. Some or all radiating elements 102/103 may be linear dual-polarized +/−45 slant.

As exemplarily shown in FIGS. 2-5, there may be three dipole radiating elements 102 working in the LB, and twelve patch radiating elements 103 working in the HB. In this particular example, the HB radiating elements 103 are clustered into four groups of three dual-polarized radiating elements 103 each (best seen in FIG. 4), wherein two clusters are on one (long) side of the antenna element 100, and the other two clusters are on the other (long) side of the antenna element 100.

The above-mentioned frequency bands, dimensions and clustering serve only as an example to convey an idea of some embodiments. However, further embodiments can be extended to be used with any other combination of frequency bands, dimensions and clustering. The embodiments in the present disclosure are also not limited to any specific kind of radiating element(s) 102 and 103.

Figure 6:
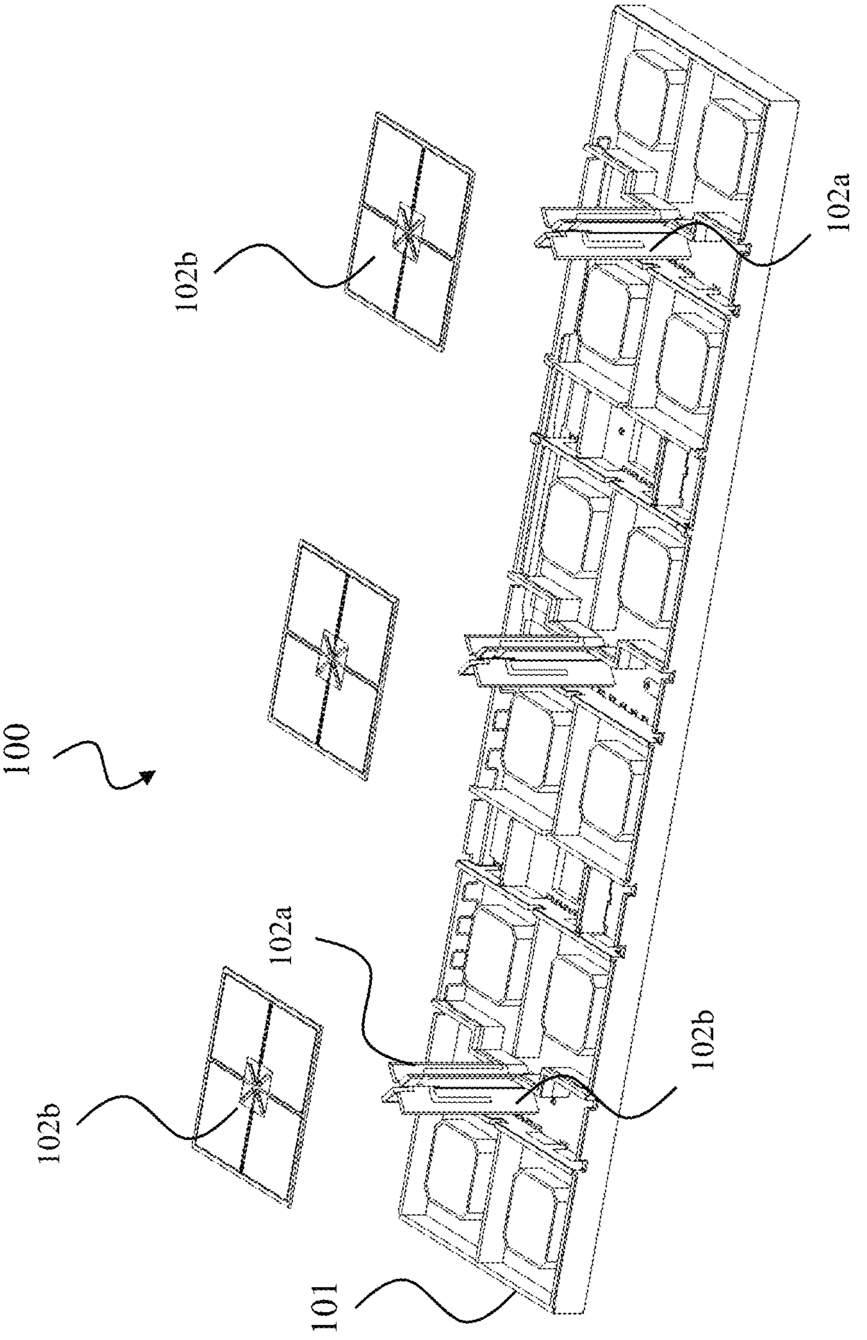
FIG. 6 shows an antenna element according to at least one embodiment.

FIG. 6 shows an antenna element 100 according to at least one embodiment, which builds on the antenna element(s) described with respect to FIGS. 2-5. Same elements in FIG. 6 and FIGS. 2-5 are provided with the same reference signs, and may be implemented likewise. In particular, FIG. 6 shows that a first part 102*a* of a first radiating element 102 may be formed by the dielectric body 101, and a second part 102*b* of the first radiating element 102 may be implemented as separate part 102*b*, i.e., as a part 102*b* that is added onto the dielectric body 101. For example, as shown in FIG. 6, a dipole of the first radiating element 102 may be implemented in an additional PCB (being the part 102*b*), which may be soldered to the part 102*a*, specifically a balun, of the first radiating element 102 formed by the dielectric body 101. In particular, each of the one or more first radiating elements 102 may comprise a balun 102*a* formed by the dielectric body 101, and may comprise an additional PCB 102*b*, in which a dipole is formed, the additional PCB 102*b* being connected to the balun 102*a*.

Also a first part 103*a* of a second radiating element 103 may be formed by the dielectric body 101, and a second part 103*b* (shown in FIG. 7) of the second radiating element 103 may be formed as separate part 103*b*, i.e., as a part 103*b* that is added onto the dielectric body 101. For instance, each of the one or more second radiating elements 103 may comprise a first part (e.g., patch) 103*a* formed by the dielectric body 101, and may comprise a second part (e.g., patch) 103*b* connected to the first part 103*a*.

Figure 7:
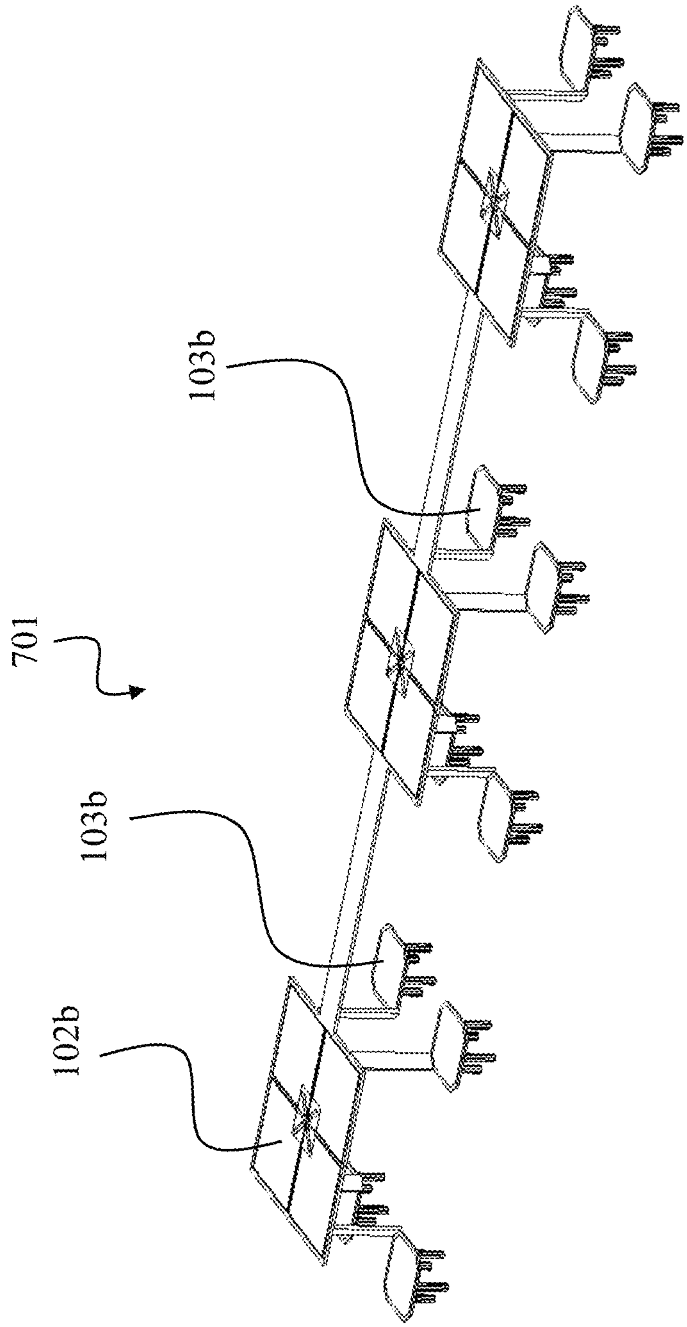
FIG. 7 shows a further dielectric body of an antenna element according to at least one embodiment.
Figure 8:
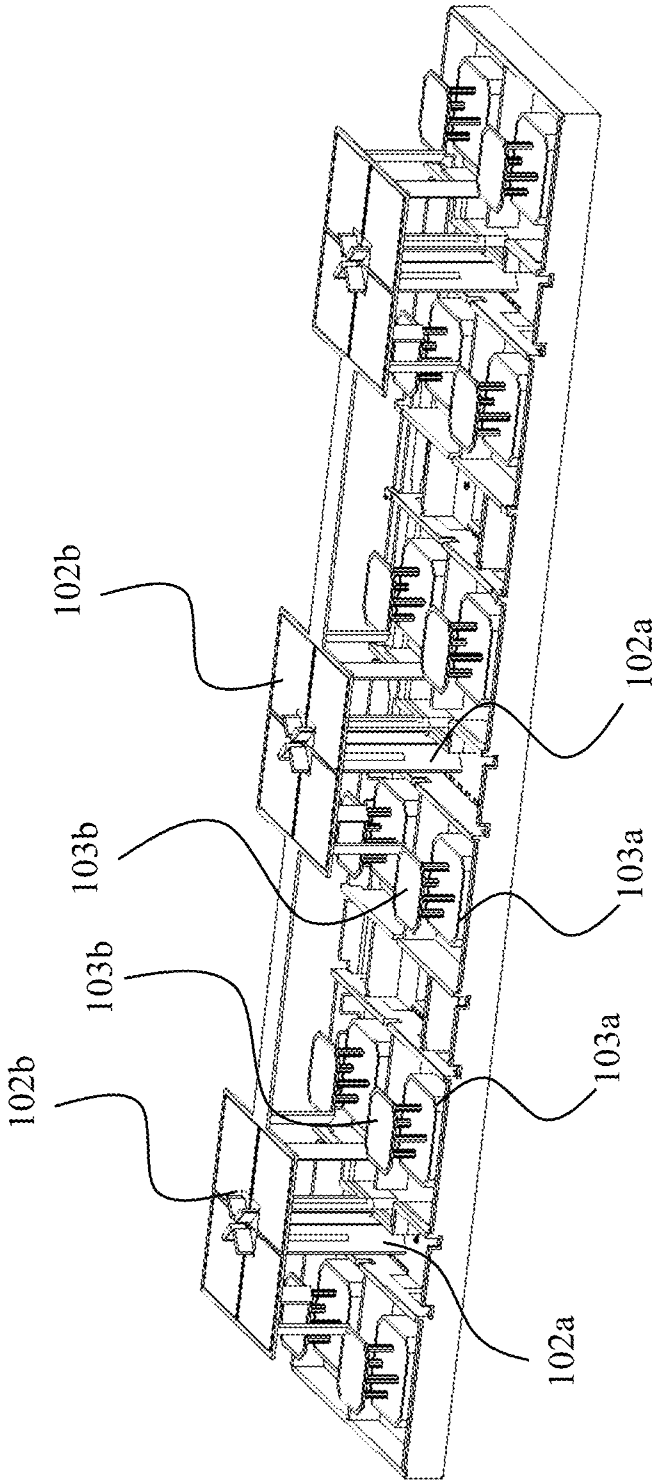
FIG. 8 shows an antenna element according to at least one embodiment comprising a dielectric body and a further dielectric body.

In this respect, FIG. 7 shows that the second parts 102*b* and 103*b* of the one or more first radiating elements 102 and the one or more second radiating elements 103, respectively, may be formed, at least partly, by a further dielectric body 701. For instance, the second patch 103*b* and the additional PCB 102*b* may be formed, respectively, by the further dielectric body 701 (e.g., with one or more metal layers) of the antenna element 100. The further dielectric body 701 may be attached/connected to the dielectric body 101 (shown in the assembled state in FIG. 8).

A reason for not including all the components into the dielectric body 101 may be, for example, that the presence of the dipole (in FIG. 7 provided/defined in the additional PCB 102*b*) would complicate the molding and the etching of the dielectric body 101, and would thus increase production costs. The additional stacked patches 103*b* may further increase the bandwidth of the second array (e.g., the HB array), and may thus be considered if the bandwidth requirements are not possible to achieve with only one single patch 103*a*. A good alternative to minimize the number of components would be to merge all the additional parts 102*b* and 103*b* (e.g., LB dipole PCB 102*b*, and HB stacked patches 103*b*) into the further dielectric body 701, for instance, being another metallized plastic part.

Figure 9:
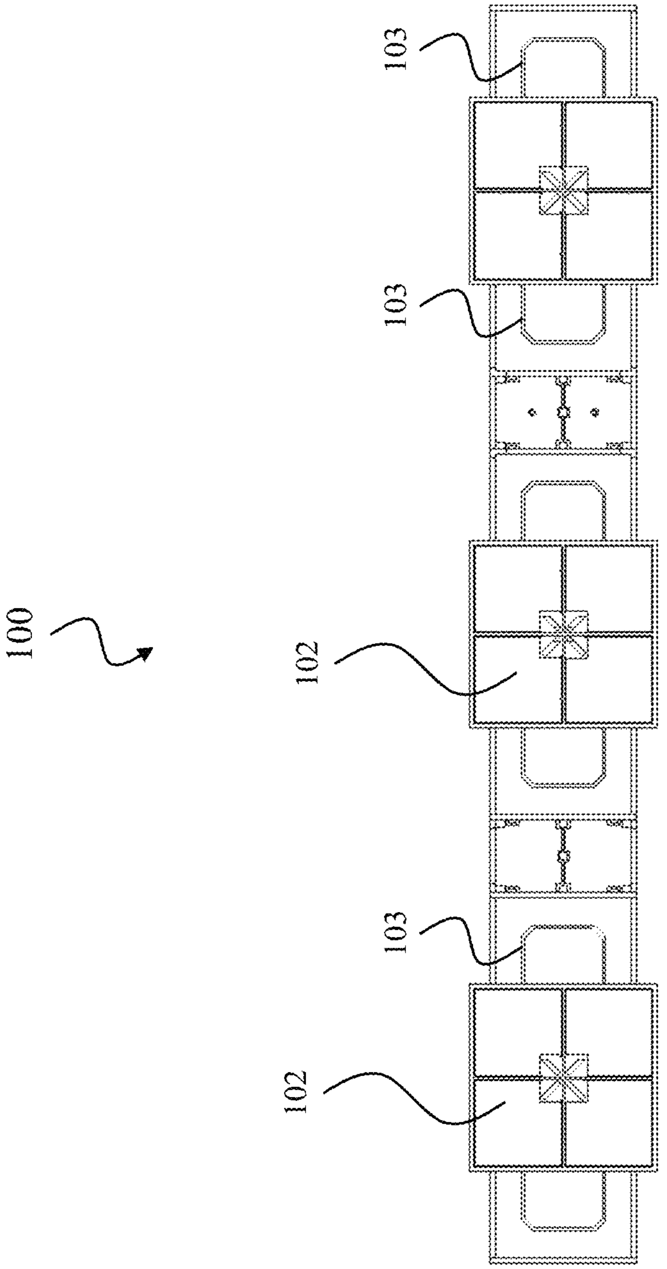
FIG. 9 shows an exemplary antenna element, according to at least one embodiment, with first and second radiating elements arranged along the same line.

In at least one embodiment, HB radiating elements 103 may be arranged side-by-side with respect to LB radiating elements 102 (see e.g., FIGS. 2-5). However, as shown in FIG. 9, illustrating an antenna element 100 according to at least one embodiment, it may also be possible to have them arranged along the same line, e.g., along the length of the antenna element 100.

Further, in at least one embodiment, the second feeding network 105 may be arranged in the bottom, i.e., the base plate 101*a*, whereas the first feeding network 104 is arranged in the one or more wall elements 101*b*, 101*c*, particularly the outer wall element(s) 101*b* (see e.g., FIGS. 2-5). This may be a preferred option when a number of columns of second radiating elements 103 is higher than a number of columns of first radiating elements 102 (a column being a set of radiating elements 102/103 arranged one after the other on a common axis, wherein the common axis is, in particular, directed across to the length of the base plate 101*a*, more particularly perpendicular to the length (longer side) of the base plate 101*a*; similarly a row of radiating elements 102/103 may be perpendicular to a column of radiating elements 102/103). However, for a situation, in which the number of columns of second radiating elements 103 is the same as the number of columns of first radiating elements 102, as in the antenna element of FIG. 9, it may be preferable to have the second feeding network 105 arranged in the one or more wall elements 101*b*, 101*c*, particularly outer wall element(s) 101*b*, and/or the first feeding network 104 in the base plate 101*a*.

Figure 10:
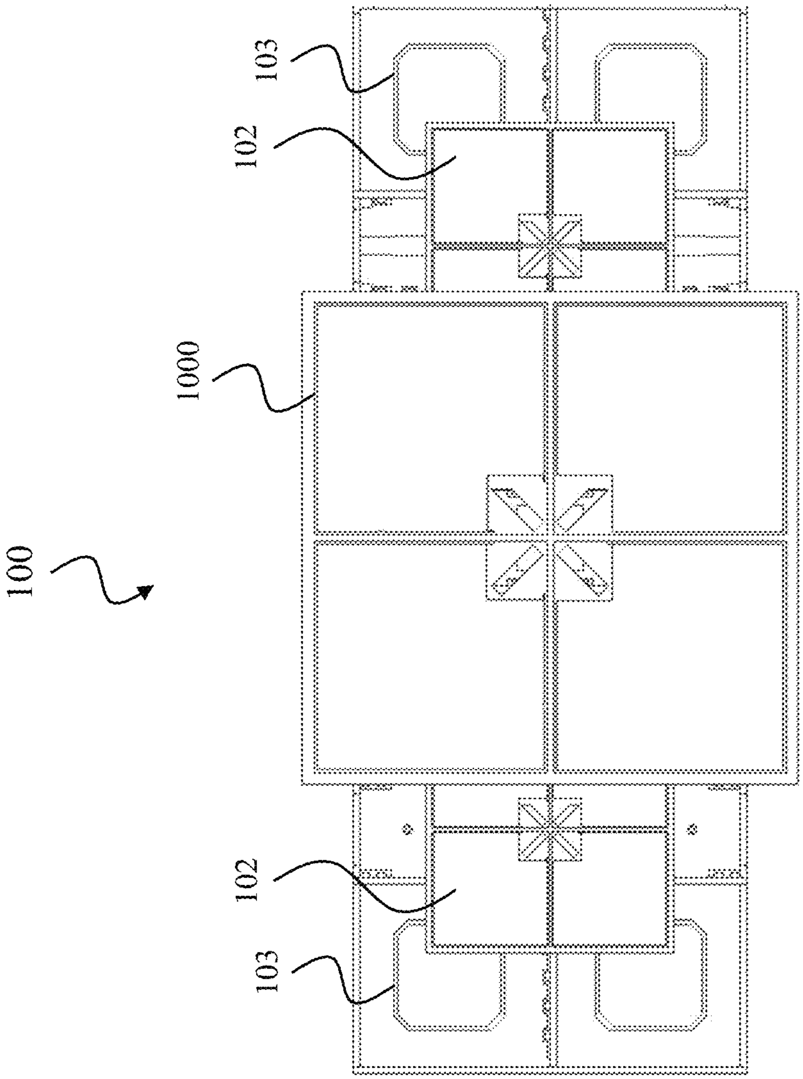
FIG. 10 shows an exemplary antenna element, according to at least one embodiment, in a triple-band implementation.

In at least another embodiment, a third frequency band may be added coexisting in the same dielectric body 101. For instance, FIG. 10 shows an antenna element 100 according to at least one embodiment, which builds on the antenna element(s) described with respect to FIGS. 2-5. Same elements in FIG. 10 and FIGS. 2-5 are provided with the same reference signs, and may be implemented likewise. In particular, FIG. 10 shows a triple-band antenna element 100. The antenna element 100 comprises one or more third radiating elements 1000 configured to radiate in a third frequency band (higher than the first and the second frequency band, or lower than the first and the second frequency band, or between the first and the second frequency band). The antenna element 100 may also comprise a third feeding network connected to the one or more third radiating elements 1000, for operating the one or more third radiating elements 1000 as a third antenna array. The third feeding network may be formed, at least partly, as a metal layer on the dielectric body 101, for instance, on the one or more wall elements 101*b*, 101*c* like the first and second feeding networks 104 and 105 described above.

Figure 11:
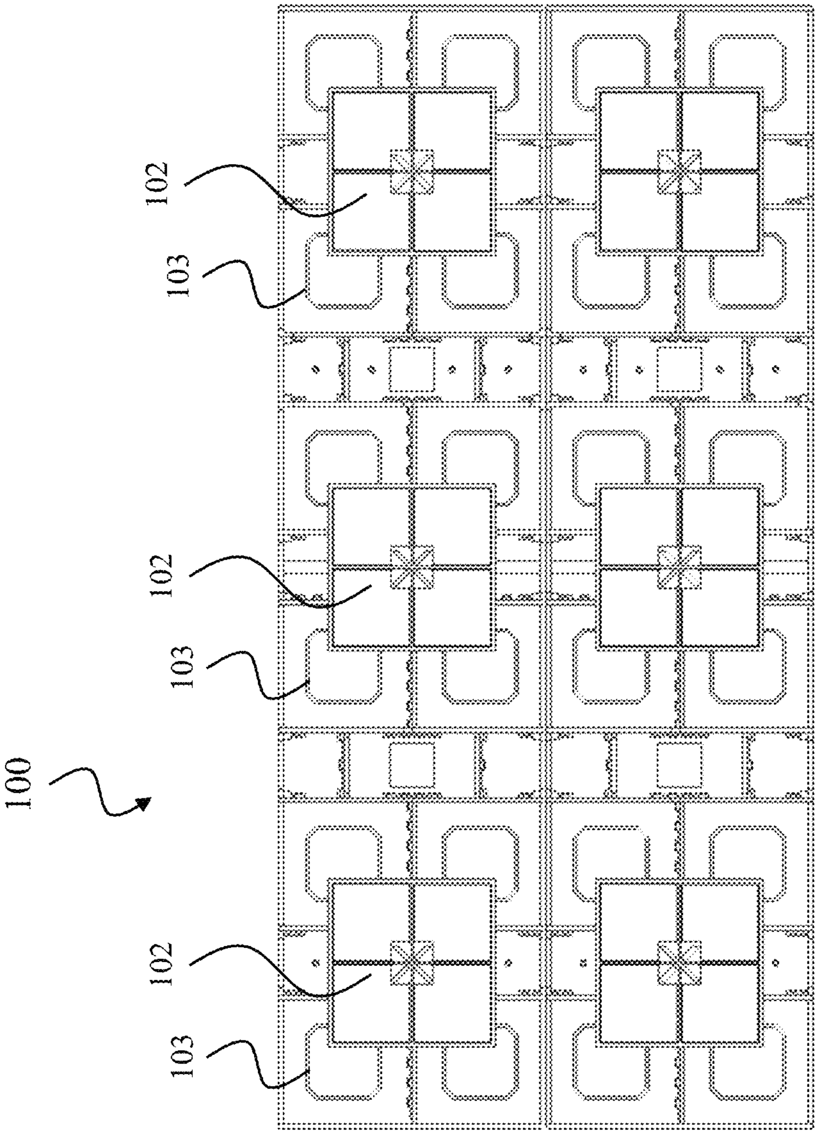
FIG. 11 shows an exemplary antenna element, according to at least one embodiment, with a 2LB/4HB combination.
Figure 12:
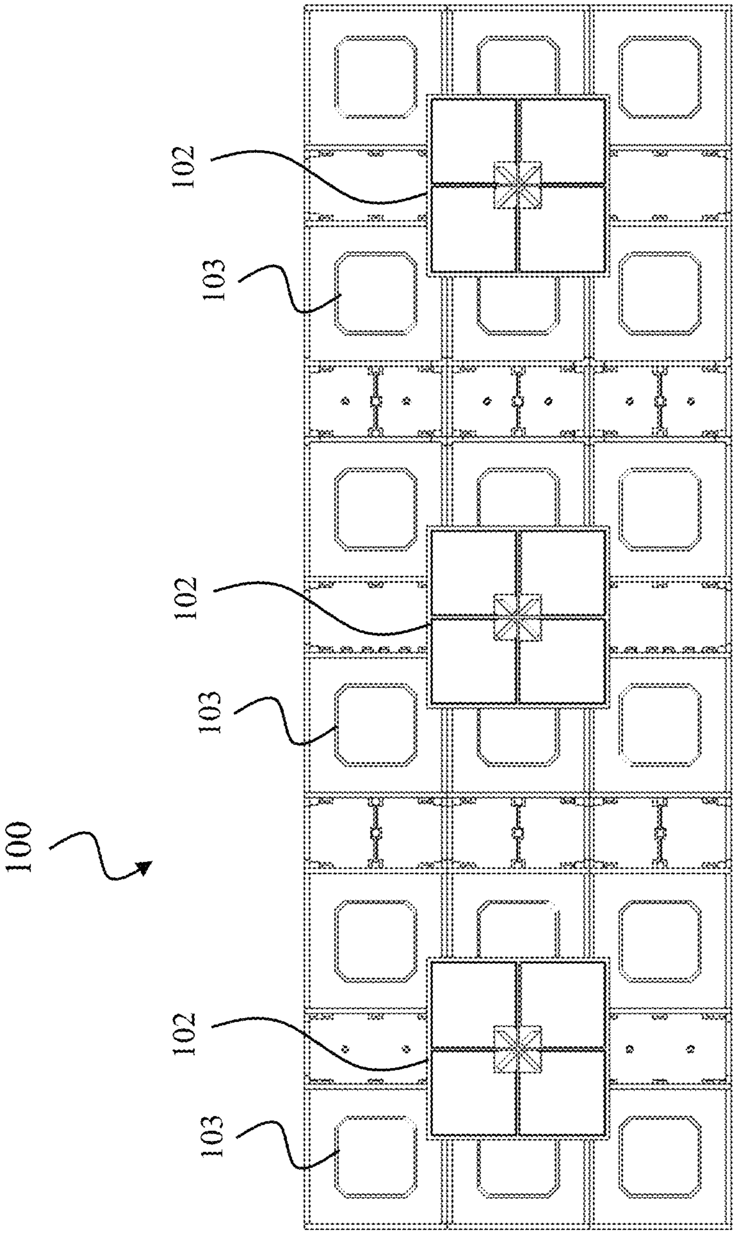
FIG. 12 shows an exemplary antenna element, according to at least one embodiment, with a 1LB/3HB combination.
Figure 13:
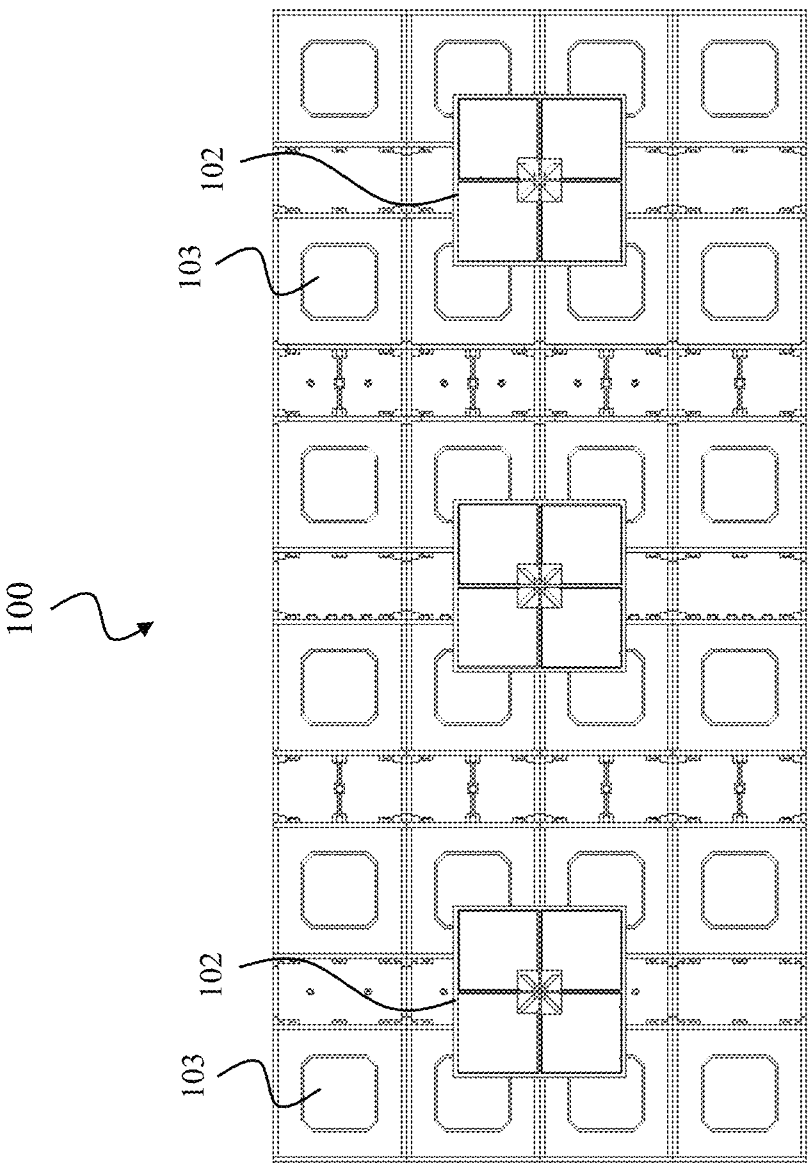
FIG. 13 shows an exemplary antenna element, according to at least one embodiment, with a 1LB/4HB combination.

Moreover, in other embodiments, different combinations of HB/LB radiating element columns could be considered. For instance, in FIGS. 11-13 some examples are depicted. In particular, FIG. 11 shows an exemplary antenna element 100 according to at least one embodiment with a 2LB/4HB combination, i.e., each of LB columns includes two LB radiating elements 102, and each of HB columns includes four HB radiating elements 103. FIG. 12 shows an exemplary antenna element 100 according to at least one embodiment with a 1LB/3HB combination, i.e., each of LB columns includes one LB radiating element 102, and each of HB columns includes three HB radiating elements 103. FIG. 13 shows an exemplary antenna element 100 according to at least one embodiment with a 1LB/4HB combination, i.e., each of LB columns includes one LB radiating element 102, and each of HB columns includes four HB radiating elements 103.

Figure 14:
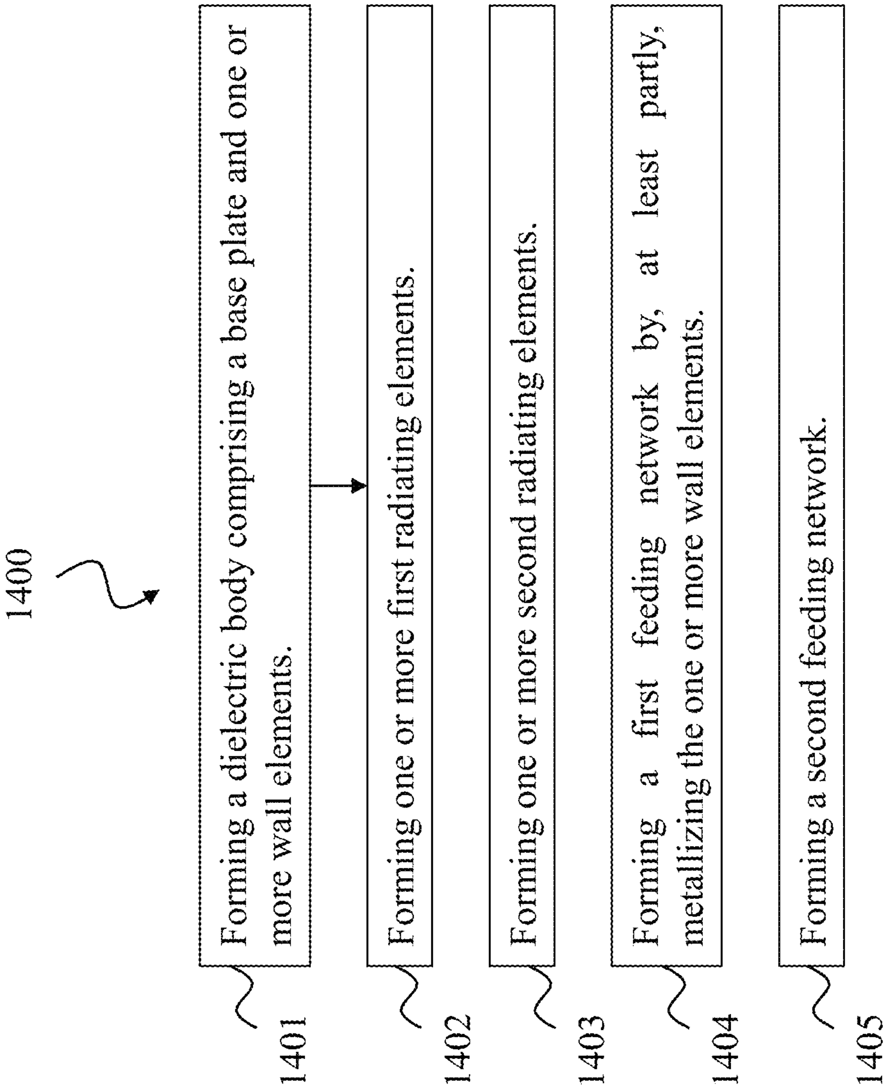
FIG. 14 shows a flow chart of a method according to at least one embodiment.

FIG. 14 shows a flow chart of a method 1400 according to at least one embodiment. The method 1400 may be used to fabricate the antenna element 100 described with respect to any of the previous figures.

The method comprises a step 1401 of forming a dielectric body 101 comprising a base plate 101*a* and one or more wall elements 101*b*, 101*c* arranged on the base plate 101*a*. Further, the method comprises a step 1402 of forming one or more first radiating elements 102 arranged on the base plate 101*a*, each first radiating element 102 being configured to radiate in a first frequency band, and a step 1403 of forming one or more second radiating elements 103 arranged on the base plate 101, each second radiating element 103 being configured to radiate in a second frequency band. Further, the method 1400 comprises a step 1404 of forming a first feeding network 104 connected to the one or more first radiating elements 102, for operating the one or more first radiating elements as a first antenna array, and a step 1405 of forming a second feeding network 105 connected to the one or more second radiating elements 103, for operating the one or more second radiating elements as a second antenna array. The first feeding network 104 is formed, at least partly, by metallizing the one or more wall elements 101*b*, 101*c*, in particular, one or more outer wall elements 101*b* and/or one or more inner wall elements 101*c*. The second feeding network 105 may be formed, at least partly, by metallizing the base plate 101*a*.

The foregoing descriptions are merely specific implementations of this application, but are not intended to limit the protection scope of this application. Any variation or replacement readily figured out by a person ordinarily skilled in the art within the technical scope disclosed in this application shall fall within the protection scope of this application. Therefore, the protection scope of this application shall be subject to the protection scope of the claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

The invention claimed is:

1. An antenna element for a multi-band antenna device, the antenna element comprising:

a dielectric body provided with one or more metal layers, the dielectric body comprising a base plate and one or more wall elements arranged on the base plate;

one or more first radiating elements arranged on the base plate, each of the one or more first radiating elements being configured to radiate in a first frequency band;

one or more second radiating elements arranged on the base plate, each of the one or more second radiating elements being configured to radiate in a second frequency band;

a first feeding network connected to the one or more first radiating elements, for operating the one or more first radiating elements as a first antenna array; and a second feeding network connected to the one or more second radiating elements, for operating the one or more second radiating elements as a second antenna array;

wherein the first feeding network is provided, at least partly, as a metal layer of the one or more metal layers on the one or more wall elements, the one or more wall elements comprise an outer wall element, which extends along edges of the base plate, a part of the first feeding network is provided as a metal layer of the one or more metal layers on the outer wall element, the one or more wall elements further comprise one or more inner wall elements, each of the one or more inner wall elements connecting the outer wall element to one of the one or more first radiating elements, and a further part of the first feeding network is provided as a metal layer of the one or more metal layers on the one or more inner wall elements.

2. The antenna element according to claim 1, wherein:

the part of the first feeding network is provided as a metal layer of the one or more metal layers on one of surfaces of the outer wall element, and a ground for the first feeding network is provided as a metal layer of the one or more metal layers on an opposite surface of the surfaces of the outer wall element.

3. The antenna element according to claim 1, wherein:

the outer wall element is configured to conform radiation from the one or more first radiating elements and from the one or more second radiating elements; or the outer wall element is configured to conform radiation from the one or more first radiating elements or from the one or more second radiating elements.

4. The antenna element according to claim 1, wherein:

the first feeding network comprises a first feeding element for operating the one or more first radiating elements according to a first polarization, and a second feeding element for operating the one or more first radiating elements according to a second polarization;

the outer wall element comprises a first wall section and a second wall section; and the first feeding element is provided as a metal layer of the one or more metal layers on the first wall section, and the second feeding element is provided as a metal layer of the one or more metal layers on the second wall section.

5. The antenna element according to claim 1, wherein:

the second feeding network is provided, at least partly, as a metal layer of the one or more metal layers on the base plate.

6. The antenna element according to claim 5, wherein:

the one or more wall elements, the one or more first radiating elements and the one or more second radiating elements are arranged on an upper surface of the base plate;

a part of the second feeding network is provided as a metal layer of the one or more metal layers on a lower surface of the base plate; and the base plate is arranged on a reflector plate of the antenna element, the reflector plate serving as ground for the second feeding network.

7. The antenna element according to claim 6, wherein:

the reflector plate is configured to reflect radiation from the one or more first radiating elements and from the one or more second radiating elements into a main radiation direction; or the reflector plate is configured to reflect radiation from the one or more first radiating elements or from the one or more second radiating elements into a main radiation direction.

8. The antenna element according to claim 5, wherein:

the one or more wall elements, the one or more first radiating elements and the one or more second radiating elements are arranged on an upper surface of the base plate;

the second feeding network is provided as a metal layer of the one or more metal layers on the upper surface of the base plate; and a ground for the second feeding network is provided as a metal layer of the one or more metal layers on a lower surface of the base plate.

9. The antenna element according to claim 1, wherein:
the first feeding network and the second feeding network are arranged without line crossing of feeding lines of the first feeding network and the second feeding network.

10. The antenna element according to claim 1, wherein:
the one or more first radiating elements are one or more low band (LB) radiating elements, and the one or more second radiating elements are one or more high band (HB) radiating elements; or
the one or more first radiating elements are one or more HB radiating elements, and the one or more second radiating elements are one or more LB radiating elements.

11. The antenna element according to claim 1, wherein:
the first frequency band is lower than the second frequency band; or
the first frequency band is a frequency range of 1.7-2.7 GHz, and the second frequency band is a frequency range of 3.3-3.8 GHz.

12. The antenna element according to claim 1, wherein:
the one or more first radiating elements comprise one or more dipole radiating elements; or
the one or more second radiating elements comprise one or more patch radiating elements.

13. The antenna element according to claim 1, wherein:
the one or more first radiating elements or the one or more second radiating elements comprise one or more linear dual-polarized radiating elements.

14. The antenna element according to claim 1, wherein:
the one or more first radiating elements or the one or more second radiating elements are formed, at least partly, by the dielectric body.

15. The antenna element according to claim 1, wherein:
each of the one or more second radiating elements comprises:
a first patch formed by the dielectric body, and
a second patch stacked onto the first patch.

16. The antenna element according to claim 1, wherein:
each of the one or more first radiating elements comprises:
a balun formed by the dielectric body, and
a printed circuit boards (PCB), in which a dipole is formed, the PCB being connected to the balun.

17. A multi-band antenna device, comprising one or more antenna elements, each of the one or more antenna elements comprising:
a dielectric body provided with one or more metal layers, the dielectric body comprising a base plate and one or more wall elements arranged on the base plate;
one or more first radiating elements arranged on the base plate, each of the one or more first radiating elements being configured to radiate in a first frequency band;
one or more second radiating elements arranged on the base plate, each of the one or more second radiating elements being configured to radiate in a second frequency band;
a first feeding network connected to the one or more first radiating elements, for operating the one or more first radiating elements as a first antenna array; and
a second feeding network connected to the one or more second radiating elements, for operating the one or more second radiating elements as a second antenna array;
wherein
the first feeding network is provided, at least partly, as a metal layer of the one or more metal layers on the one or more wall elements,
the second feeding network is provided, at least partly, as a metal layer of the one or more metal layers on the base plate,
the one or more wall elements, the one or more first radiating elements and the one or more second radiating elements are arranged on an upper surface of the base plate, and
either
a part of the second feeding network is provided as a metal layer of the one or more metal layers on a lower surface of the base plate, and the base plate is arranged on a reflector plate of the antenna element, the reflector plate serving as ground for the second feeding network, or
the second feeding network is provided as a metal layer of the one or more metal layers on the upper surface of the base plate, and a ground for the second feeding network is provided as a metal layer of the one or more metal layers on a lower surface of the base plate.

18. A method of producing an antenna element for a multi-band antenna device, the method comprising:
forming a dielectric body comprising a base plate and one or more wall elements arranged on the base plate;
forming one or more first radiating elements arranged on the base plate, each of the one or more first radiating elements being configured to radiate in a first frequency band;
forming one or more second radiating elements arranged on the base plate, each of the one or more second radiating elements being configured to radiate in a second frequency band;
forming a first feeding network connected to the one or more first radiating elements, for operating the one or more first radiating elements as a first antenna array; and
forming a second feeding network connected to the one or more second radiating elements, for operating the one or more second radiating elements as a second antenna array;
wherein
the first feeding network is formed, at least partly, by metallizing the one or more wall elements,
each of the one or more first radiating elements comprises a first lower part formed by the dielectric body and arranged on the base plate, and a first upper part,
each of the one or more second radiating elements comprises a second lower part formed by the dielectric body and arranged on the base plate, and a second upper part, and
the method further comprises:
forming a further dielectric body separately from the dielectric body, wherein the first upper part of each of the one or more first radiating elements and the second upper part of each of the one or more second radiating elements are formed in the further dielectric body; and
attaching the further dielectric body to the dielectric body so that
the first upper part of each of the one or more first radiating elements is connected to the first lower part of said each of the one or more first radiating elements, thereby obtaining the one or more first radiating elements, and the second upper part of each of the one or more second radiating elements is connected to the second lower part of said each of the one or more second radiating elements, thereby obtaining the one or more second radiating elements.

19. The method according to claim 18, wherein the one or more first radiating elements comprise a plurality of first radiating elements, the one or more second radiating elements comprise a plurality of second radiating elements, and in the further dielectric body, the first upper parts of the plurality of first radiating elements are connected to each other, and the first upper part of each of the plurality of first radiating elements is connected to at least one of the second upper parts of the plurality of second radiating elements.

20. The multi-band antenna device according to claim 17, wherein, for at least one of the one or more antenna elements, the reflector plate is configured to reflect radiation from the one or more first radiating elements and from the one or more second radiating elements into a main radiation direction; or the reflector plate is configured to reflect radiation from the one or more first radiating elements or from the one or more second radiating elements into a main radiation direction.

* * * * *